United States Patent
Henning, Jr.

(10) Patent No.: US 9,550,566 B2
(45) Date of Patent: Jan. 24, 2017

(54) DISC-SHAPED TURBO-JET AIRCRAFT

(71) Applicant: John Francis Henning, Jr., Petaluma, CA (US)

(72) Inventor: John Francis Henning, Jr., Petaluma, CA (US)

(*) Notice: Subject to any disclaimer, the term of this patent is extended or adjusted under 35 U.S.C. 154(b) by 0 days.

(21) Appl. No.: 15/166,005

(22) Filed: May 26, 2016

(65) Prior Publication Data

US 2016/0347448 A1    Dec. 1, 2016

Related U.S. Application Data (60) Provisional application No. 62/167,189, filed on May 27, 2015.

(51) Int. Cl.

| | |
|---|---|
| B64C 29/00 | (2006.01) |
| B64C 39/00 | (2006.01) |
| B64C 39/06 | (2006.01) |
| B64C 27/20 | (2006.01) |
| B64C 3/18 | (2006.01) |
| B64C 27/50 | (2006.01) |
| B64C 27/82 | (2006.01) |
| B64D 27/16 | (2006.01) |
| B64D 37/04 | (2006.01) |
| B64C 15/12 | (2006.01) |
| B64D 41/00 | (2006.01) |

(52) U.S. Cl.
CPC .......... *B64C 29/0075* (2013.01); *B64C 3/187* (2013.01); *B64C 15/12* (2013.01); *B64C 27/20* (2013.01); *B64C 27/50* (2013.01); *B64C 27/82* (2013.01); *B64C 39/001* (2013.01); *B64C 39/06* (2013.01); *B64D 27/16* (2013.01); *B64D 37/04* (2013.01); *B64C 2027/8218* (2013.01); *B64C 2027/8227* (2013.01); *B64D 2041/002* (2013.01)

(58) Field of Classification Search
USPC ............. 244/23 C, 12.3, 23 A, 34 A, 36
See application file for complete search history.

(56) References Cited

U.S. PATENT DOCUMENTS

| | | | | |
|---|---|---|---|---|
| 2,935,275 | A | * 5/1960 | Grayson | B64C 39/001 244/23 C |
| 3,045,951 | A | 7/1962 | Freeland | |
| 3,065,935 | A | 11/1962 | Dubbury et al. | |
| 3,082,977 | A | 3/1963 | Arlin | |
| 3,514,053 | A | 5/1970 | McGuiness | |
| 3,614,030 | A | * 10/1971 | Moller | B64C 39/001 244/23 C |
| 3,640,489 | A | * 2/1972 | Jaeger | B64C 39/001 244/23 C |
| 3,677,503 | A | * 7/1972 | Freeman, Jr. | B64C 11/001 244/23 C |

(Continued)

*Primary Examiner* — Christopher P Ellis
(74) *Attorney, Agent, or Firm* — Craig M. Stainbrook; Stainbrook & Stainbrook, LLP (57) ABSTRACT

A disc-shaped aircraft including an airfoil having a convex upper surface and a planar lower surface with the edges of the surfaces meeting at the periphery of the disc and having a plurality of rotational mini turbine jets affixed sequentially at the edge of the circumference of the disc, the turbine jets effecting vertical, horizontal, and directional thrust under computer and pilot control. Stable flight is maintained by an internal gyroscopic counter-rotating rotor blade system, individual control of the turbine jets, and a series of retractable flaps.

20 Claims, 10 Drawing Sheets

(56) References Cited

U.S. PATENT DOCUMENTS

| | | | | |
|---|---|---|---|---|
| 3,690,597 | A * | 9/1972 | Di Martino | B64C 27/20 244/23 C |
| 3,933,325 | A | 1/1976 | Kaelin | |
| 4,014,483 | A * | 3/1977 | MacNeill | B64C 39/001 244/137.2 |
| 4,023,751 | A * | 5/1977 | Richard | B64C 39/001 244/23 C |
| 4,214,720 | A * | 7/1980 | DeSautel | B64C 39/001 244/12.2 |
| 5,039,031 | A * | 8/1991 | Valverde | B64C 39/001 244/12.2 |
| 5,344,100 | A * | 9/1994 | Jaikaran | B64C 27/20 244/12.2 |
| 6,382,560 | B1 | 5/2002 | Ow | |
| 6,575,401 | B1 * | 6/2003 | Carver | B64C 27/20 244/12.2 |
| 7,465,236 | B2 * | 12/2008 | Wagels | A63G 31/00 434/34 |
| 8,991,743 | B1 * | 3/2015 | Pope | B64C 27/82 244/17.11 |
| 2005/0230525 | A1 * | 10/2005 | Paterro | B64C 39/001 244/23 B |
| 2010/0320333 | A1 * | 12/2010 | Martin | B64C 39/001 244/23 A |
| 2013/0206915 | A1 * | 8/2013 | Desaulniers | B64C 39/024 244/165 |

* cited by examiner

DISC-SHAPED TURBO-JET AIRCRAFT

CROSS REFERENCES TO RELATED APPLICATIONS

The present application claims priority to, and the benefit of, the filing date of U.S. Provisional Patent Application Ser. No. 62/167,189 filed May 27, 2015 (May 27, 2015), incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates to the field of transportation technology, and more specifically aircraft technology, and still more particularly to disc-shaped turbo-jet aircraft having a peripherally distributed propulsion system and stabilizing gyroscope.

Background Discussion

Lenticular and disc-shaped aircraft, when compared to alternative configurations, offer an efficient airfoil, a potentially more stable platform when employing peripheral thrust, a lower amount of drag, and a lower radar profile, all while providing direct vertical and horizontal movement options. However, of the countless disc-shaped aircraft for which patent protection has been sought, none have achieved commercial success. What the prior art of fifty years in this field has taught us is that there is a substantial collection of disc-shaped aircraft designs (flying saucers) that won't fly. This failure is concealed in patent applications by the calculated absence of any performance data that would predict a functional future for the designs—i.e., actual utility beyond that of an exotic landscape ornament. This is because they have never overcome the historical power/weight problem—that is, how to provide a disc-shaped aircraft with sufficient power to lift its weight off the ground. In almost all instances, the weight alone of the proposed power plants for these aircraft precluded any reasonable expectation of flight. The resulting patents have made their named inventors stakeholders in some undefined future technology that will confer credibility to the general concept by achieving actual flight.

Buried in the graveyard of good ideas are the many disc-shaped airframe designs disclosed in the following patents: U.S. Pat. No. 3,045,951 (to Freeland); U.S. Pat. No. 3,933,325 (to Kaelin); U.S. Pat. No. 6,382,560 (to Ow); U.S. Pat. No. 3,065,935 (to Dubbury, et al.); U.S. Pat. No. 3,082,977 (to Arlin); and U.S. Pat. No. 3,514,053 (to McGuiness), all of which are hereby incorporated in their entirety by reference herein, along with all other references cited in this application. As noted, the failure of these designs is likely attributable to the failure to address and overcome the power/weight problem recognized long ago by Wilbur and Orville Wright and Igor Sikorsky.

The foregoing patents reflect the current state of the art of which the present inventor is aware. Reference to, and discussion of, these patents and other patents herein is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The disc-shaped aircraft of the present invention departs from the prior art to achieve actual flight by answering a long unsolved problem for a lightweight power source. In an embodiment, the aircraft is a 25 foot (7.25 m) diameter disc-shaped airframe that employs a plurality of lightweight mini turbojets, each weighing approximately 3.5 lbs. (1.5 kg). This combined power package weighs only 175 lbs. (79.3 kg) but delivers a total thrust force in excess of 1500 lbs. psi (7100 N). This thrust force is sufficient to provide lift and to propel a piloted aircraft weighing approximately 800 lbs. (362.8 kg) at a speed in excess of 120 mph (53.6 m/s). This embodiment is capable of maintaining a minimum level cruise speed, at which lift equals gravity, of 52.4 mph (26.242 m/s), at an angle of attack of 4 degrees, virtually level, while at the same time possessing a formidable VTOL capacity. [Calculations provided by Mont Hubbard, Ph.D., Univ. California, Davis.] Measured against the patent history of disc-shaped aircraft, this performance data is both an unexpected and surprising development for the future and a positive affirmation of the non-obvious nature of the embodiments herein. Further, fuel consumption is conservative and economical, with a representative array of 50 turbojets operating at a cruise speed (approximately 10% of maximum thrust) requiring 40 gallons of fuel (151.42 liters) per hour.

It will be appreciated that the mini turbojet technology has itself evolved considerably, at an encouraging pace. Weight parameters have remained generally stable, but other dimensions have changed in recent years. For instance, mini turbojets sized at 6 inches in length only a few years ago are now 12 inches in length.

As will be seen below, in an embodiment, the present invention uses peripherally located miniature turbine jets ("mini turbojets") to overcome the power/weight problem in disc-shaped aircraft. Maneuverability is not sacrificed, but it is rather actually enhanced by the power plant distribution. In addition, an embodiment provides a gyroscopic mechanism consisting of counter-rotating blades rotating about the central axis of the aircraft disc and extending to an internal rim of the disc. Furthermore, in an embodiment, the disc shaped aircraft may have both standard and storage/travel configurations.

BRIEF DESCRIPTION OF SEVERAL VIEWS OF THE DRAWINGS

The invention will be better understood and its various objects and advantages will become apparent when consideration is given to the following detailed description. Such description makes reference to the annexed drawings wherein.

DRAWING REFERENCE NUMERALS [PARTS LEGEND]

- 10—Disc-shaped aircraft
- 12—Top panel
- 13—Reinforced circumferential engine mount wall
- 14—Bottom panel of disc-shaped aircraft
- 15a—Interior of disc
- 15b—Bottom panel outlet ports
- 16—Top panel circumferential ridge lines
- 17—Circumferential power alley engine bay
- 18—Power alley
- 18a—Power alley inlet/outlet ports
- 18b—Power alley shroud
- 19—Jet mounts
- 20—Mini turbojets
- 20a—Mini turbojets
- 21—Gimbals
- 22—Auxiliary engine for gyroscopic rotor blades
- 24—Supporting shaft for gyroscopic rotor blades
- 25—Center (yaw axis) of aircraft
- 26—Gear box for counter-rotating gyroscopic rotor blades
- 28—Counter-rotating gyroscopic rotor blades
- 30—Rotor fly weights
- 32—Widened centers of gyroscopic rotor blades
- 34—Rotor end perimeter rim bearings
- 36—Exterior flange plate
- 38—Landing skids
- 40—Top panel directional flaps
- 42—Pilot canopy
- 44—Pilot cabin (cockpit)
- 46—Fuel bladders
- 48—Interior fuselage rib sides
- 50—Exterior wing rib sides
- 52—Exterior wing spars
- 54—Optional turbojets on power rails
- 56—Exterior power rails
- 56a—Bottom power rails
- 58a—Storage configuration fuselage box
- 58b—Left airfoil portion
- 58c—Right airfoil portion
- 60—Alternative embodiment with downdraft ports
- 62—Downdraft ports

DETAILED DESCRIPTION OF THE INVENTION

The disc-shaped, full airfoil-surfaced aircraft of the present invention solves the power/weight problem by employing a plurality of mini turbojets to achieve and maintain effective vertical and horizontal flight and maneuvering. The potential of such embodiments for civil and military applications is manifest. Indeed, whether in drone or manned configurations, such aircraft could command the battlefield for the remainder of the twenty-first century, particularly in hostile desert environments involving terrorist activities and occupations. The simplicity of the inventive design reduces manufacturing costs and facilitates rapid manufacture.

Embodiments in this disclosure generally include a lightweight disc-shaped aircraft capable of vertical and horizontal flight and full VTOL capability with the performance data set forth above.

Figure 1:
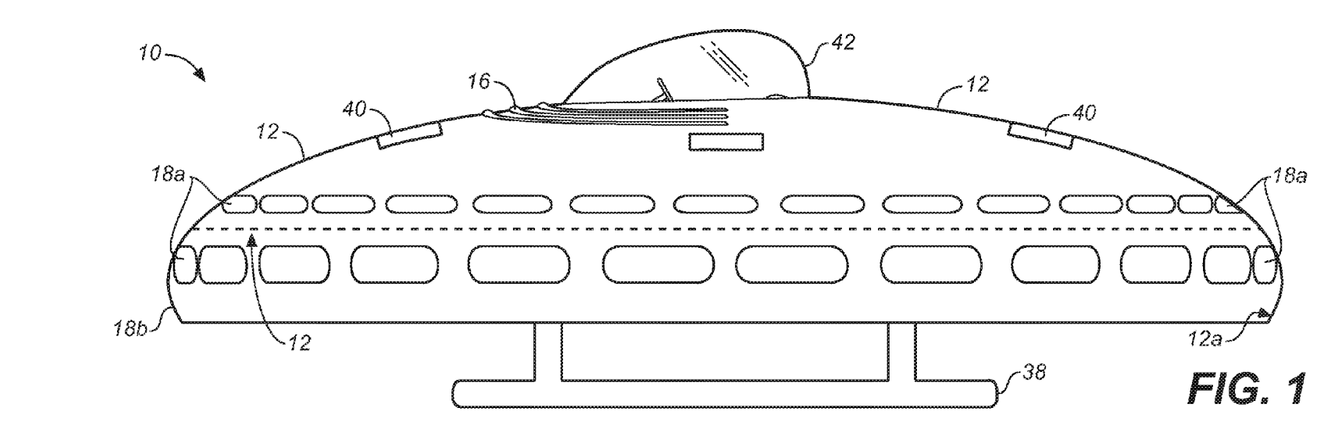
FIG. 1 is a side view in elevation of an embodiment of the inventive disc-shaped turbo aircraft.

FIG. 1 is a side elevation view of an embodiment of the inventive aircraft 10. In the embodiment, mini turbojets 20 (FIG. 3) are generally equidistantly spaced apart peripherally and circumferentially about the interior portion 15a of the perimeter 18b of the airfoil top panel 14. In an alternative embodiment, the power plants can be grouped or ganged and the groups or gangs then generally equidistantly spaced apart about the periphery. For instance, FIG. 4A and FIG. 4B show, respectively, turbojets in a vertically offset configuration and turbojets mounted in pairs. The additional power plants enabled with the grouped configuration would add weight to the aircraft; but, the additional weight is offset by the added thrust, all within expected performance parameters. Each configuration achieves an even weight distribution encircling the aircraft center of gravity. Proper spacing helps to overcome the power/weight problem. Mini turbojets suitable for the embodiment may be obtained, e.g., from JetCat USA, LLC (775 Fentress Blvd., Daytona Beach, Fla. 32114; Tel. 386-944-9122). An exemplary power plant is the currently available JetCat P140 turbine that produces 32 pounds of vertical thrust at a functional weight of 3.5 pounds. Comparable products, weighing 3 to 5 pounds, with thrust ranges from 12 to 52 pounds, are also available from JetCat and other manufactures.

As shown in FIG. 1, disc-shaped aircraft 10 includes a centrally convex top panel (i.e., upper side) 12 and a generally flat (planar) bottom 14 which combine to create an airfoil providing lift during flight. The convex top panel and planar bottom provide the opposed airfoil surfaces. The shape will be recognized to be that of the rotating flying disc commonly known as a FRISBEE® [a registered trademark of Wham-O, Inc., of Woodland Hills, Calif.]. Aircraft 10 is sheathed on the upper and lower opposed airfoil surfaces, 12, 14, respectively, the convex upper top panel and the planar lower bottom panel converging toward each other toward their peripheral edges 12a, 14, respectively. However, the peripheral edges remain spaced apart, such that in an embodiment, the airfoil is open about its periphery where needed to allow thrust from turbojets 14 to be directed downward or in other desired directions in relation to the airfoil (FIGS. 3-7).

Figure 2:
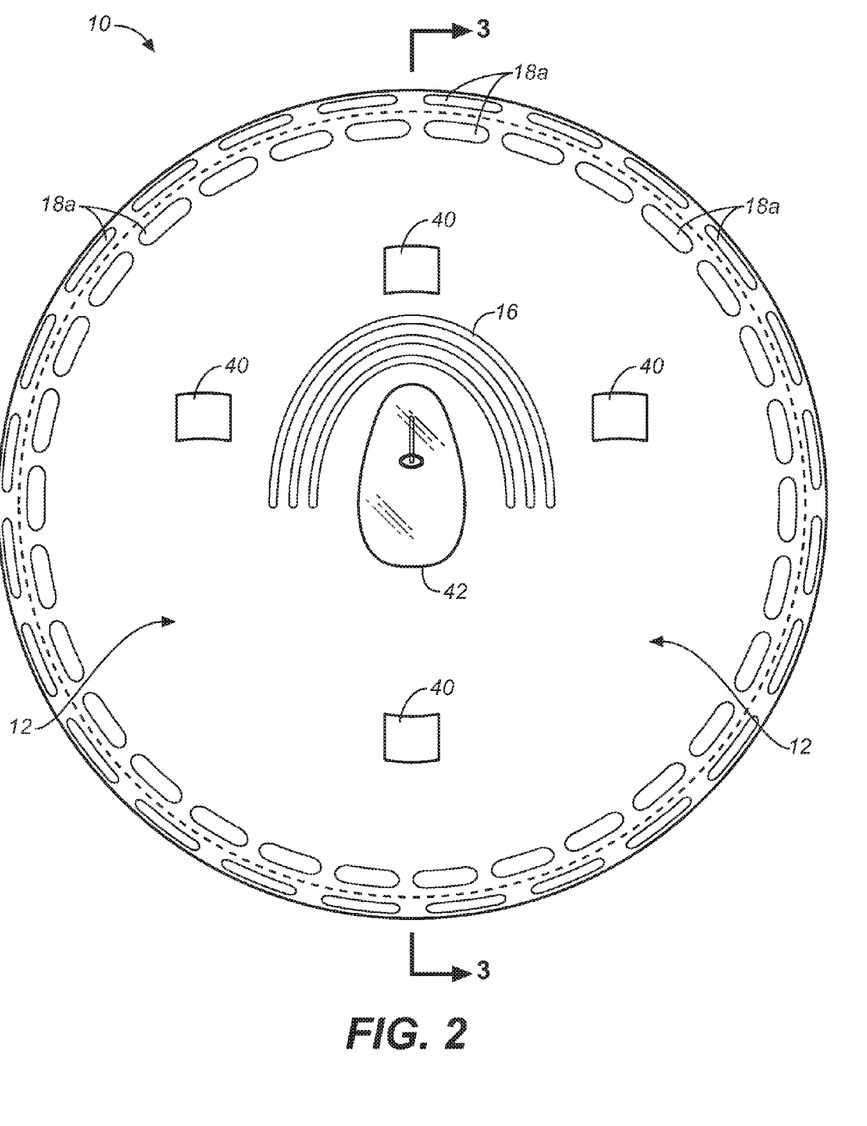
FIG. 2 is a top plan view thereof.

FIG. 2 is a top view of an embodiment of the aircraft. In FIG. 2, the forward upper surface supports numerous circumferential line ridges 16. Circumferential line ridges 16 protrude minimally above the upper panel and parallel the forward circumference of the aircraft to enhance air adhesion to the upper airfoil during forward flight.

Figure 3:
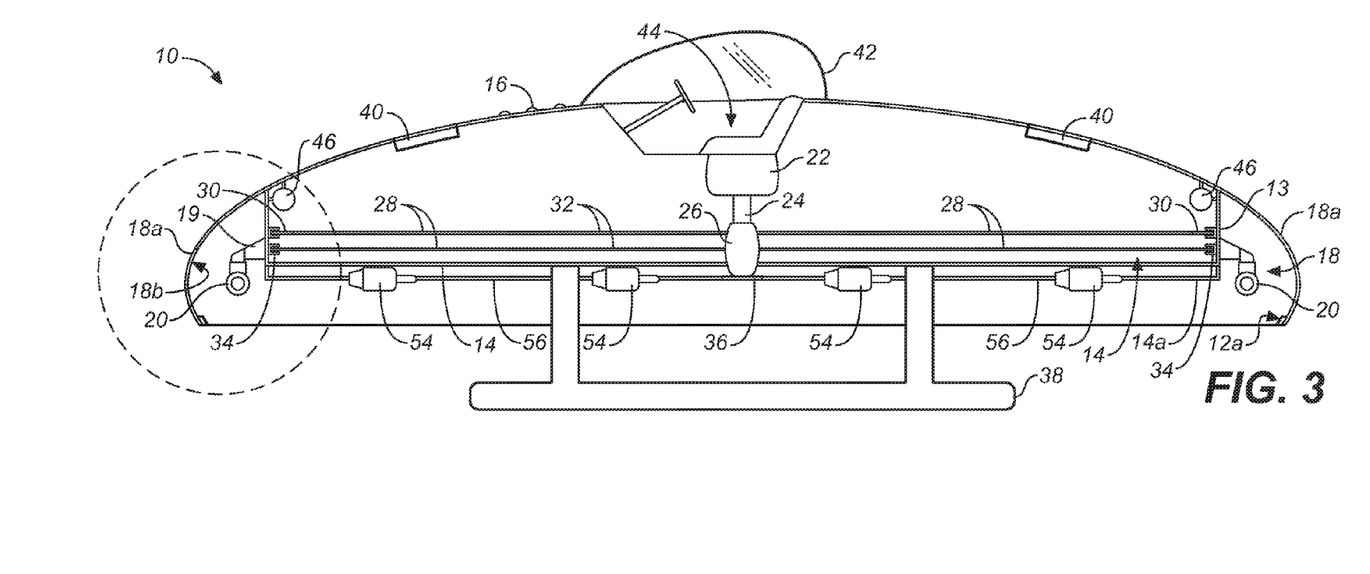
FIG. 3 is cross-sectional side view in elevation taken along section lines 3-3 of FIG. 2.

FIG. 3 is an interior sectional view of an embodiment of the aircraft. In FIG. 3, an array of multiple turbojets 20 is affixed and arranged around a reinforced circumferential engine mount wall 13 of the disc-shaped aircraft 10. Turbojets 20 are installed and covered by a skirt portion of the convex upper panel, which cooperates with the engine mount wall to define a power alley shroud 18b and forms a generally continuous circumferential engine bay or perimeter "power alley" 18, which surrounds the whole of the disc-shaped aircraft 10. The skirt, exterior side, or power alley shroud 18b of circumferential power alley 18 is shown extending below bottom 14, with the result that both faces of the exterior side are exposed to the exterior environment. The skirt portion or perimeter shroud 18b of power alley 18 is perforated on its upper and lateral surfaces with sequential air inlets to provide for air ingress and egress, and, on its lower surface, to provide an exit for thrust gases. In the embodiment, turbojets 20 may be rotated about horizontal and vertical axes, but have limited longitudinal or lateral movement.

Figure 4:
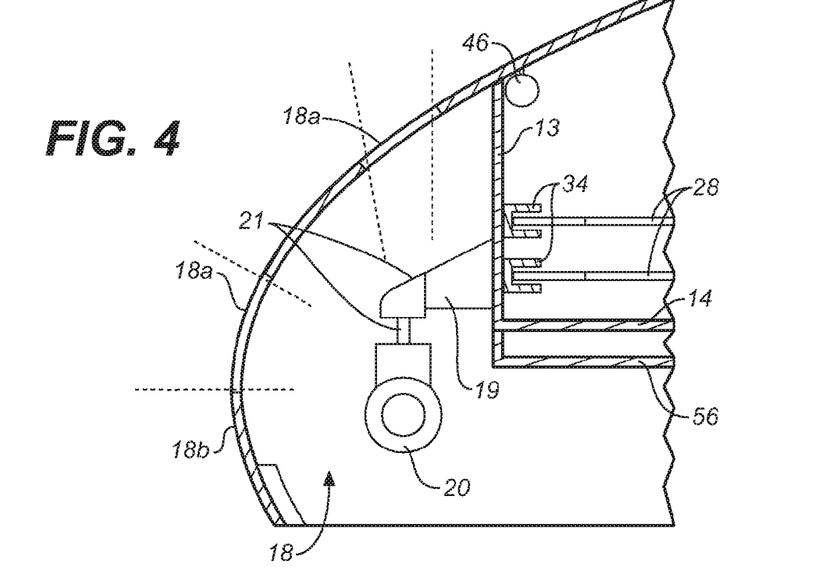
FIG. 4 is a detailed front side elevational view taken along section line 4-4 of FIG. 3.
Figure 4A:
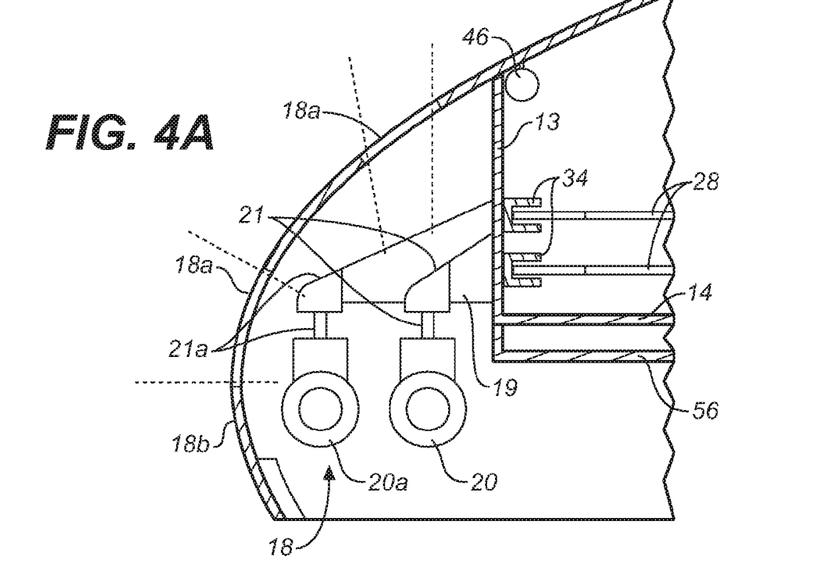
FIG. 4A is a detailed front side elevations view taken along section line 4-4 of FIG. 3 showing the mini turbojets in a side-by-side configuration.
Figure 4B:
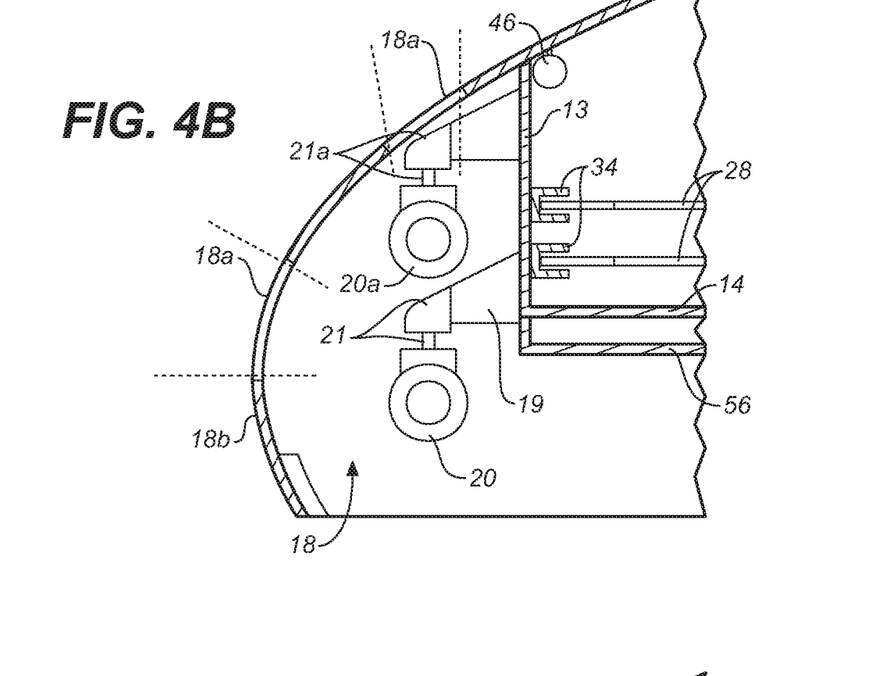
FIG. 4B is a detailed front side elevations view taken along section line 4-4 of FIG. 3 showing the mini turbojets in a vertically offset configuration.
Figure 5:
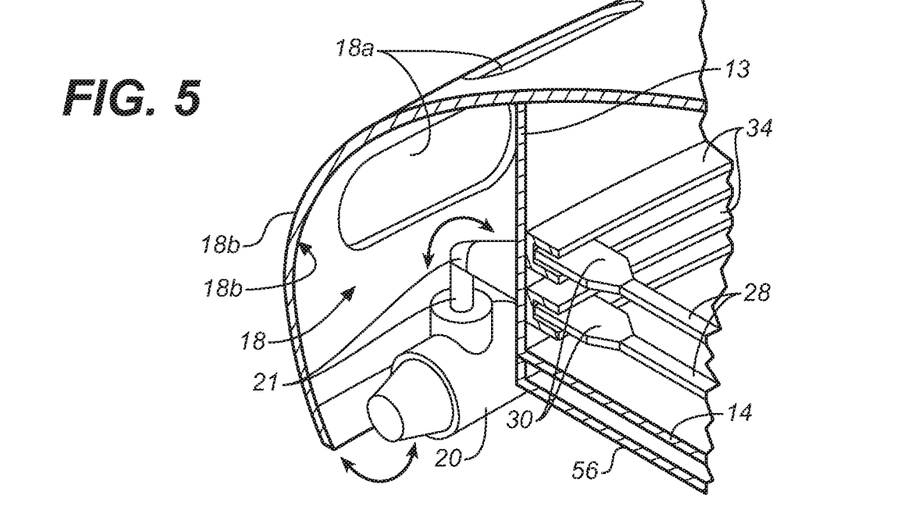
FIG. 5 is a cross-sectional upper front left perspective view of the details shown in FIG. 4, showing a turbojet as fixed in the aircraft's engine bay and enclosed in the power alley by the power alley shroud.

FIGS. 4, 4A, and 4B, are interior sectional views of embodiments of the aircraft's shrouded power alley 18. FIG. 5 is an interior sectional view of an embodiment illustrating a single turbojet 20 as fixed in the power alley 18. The turbojets 20 are suspended within the power alley 18 from fixed jet mounts 19 by gimbals 21 which allow the turbojets to be rotated in a horizontal or vertical position on vertical and horizontal axes, respectively, by actuators (not shown). FIGS. 4A-4B show grouped or ganged turbojets 20, 20a, mounted with correspondingly paired gimbals 21a.

Returning to FIG. 3, a supporting shaft 24 for counter-rotating gyroscopic rotor blades 28 (or "gyroscopes") is affixed and suspended from an auxiliary engine 22 below the pilot cabin (cockpit) 44 and near the center 25 (yaw axis) of the aircraft 10. The primary purpose of the gyroscopic rotor blades 28 is to give stability in level flight. Rotors 28 are actuated by a counter-rotating gear 26 at the bottom of shaft 24 with gyroscopic rotor blades 28 fixed in a continuous rigid plane from end to end. The size of the gyroscopic rotor blades 28 in relation to aircraft 10 results in their contributing substantially to the stability of aircraft 10, so much so that the loss of stability due to the malfunctioning of one or more of turbojets 20 or the malfunctioning of the control of turbojets 20 is greatly reduced or eliminated. Thus, gyroscopic rotors 28 enhance the safety of aircraft 10. A secondary purpose for the gyroscopic rotor blades is to create lift over the upper rear half surface of the disc by down drafting rear exterior surface air into the center of the aircraft and venting the drafted air through the bottom panel outlet ports 15b (see FIG. 7).

Figure 6:
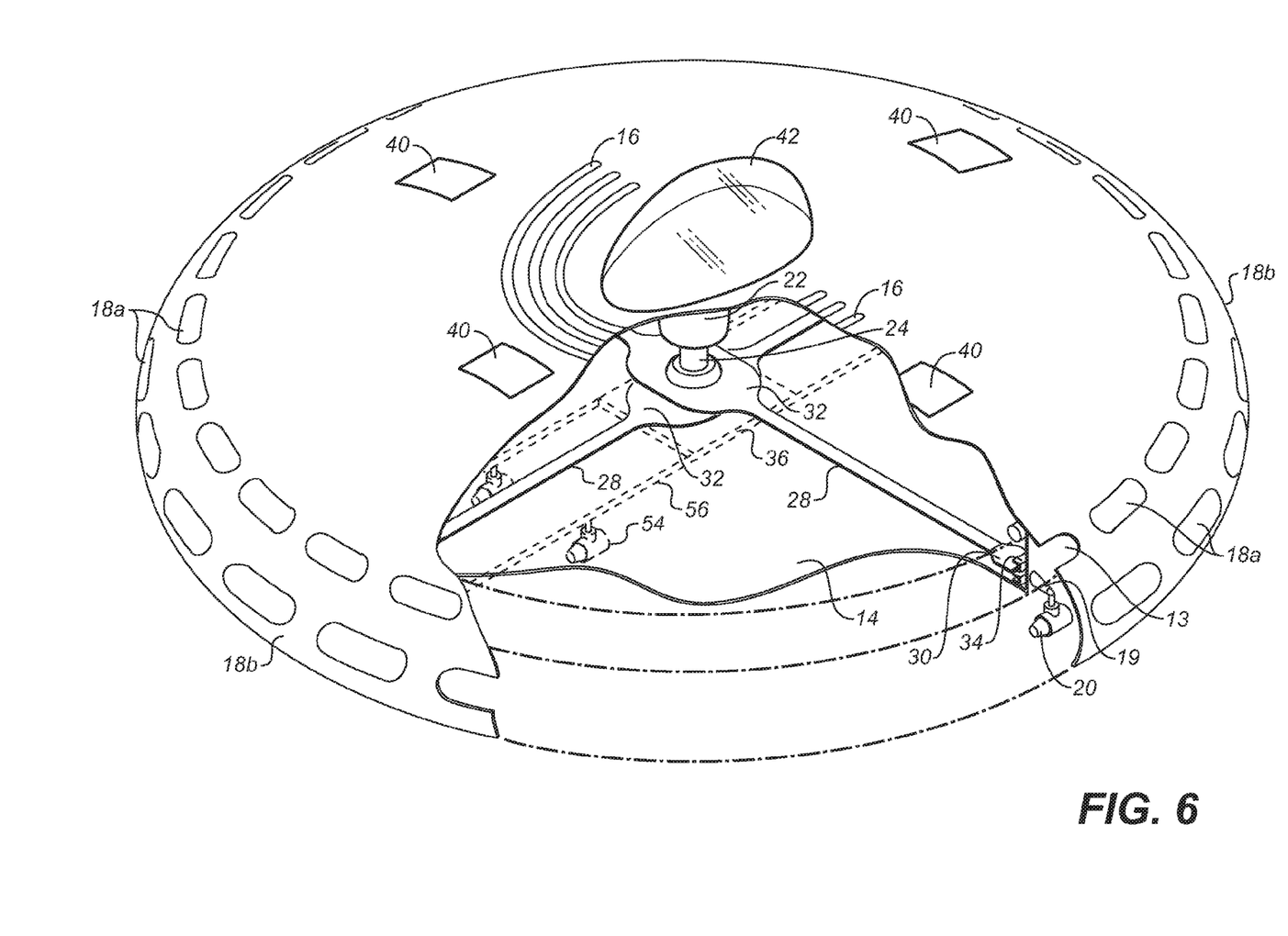
FIG. 6 is an upper front left partial cross-sectional view showing interior components of the inventive disc-shaped turbo-jet aircraft, including gyroscopic rotor blades, turbojets, power rails, and their relative respective placements.

FIG. 6 is a top and interior sectional view of an embodiment of the gyroscope rotor blades and their placement, showing that the blades may be "canted" or pitched slightly such that in operation the blades create a suction force sufficient to draw in air through the air inlets 62 in the upper rear surface of the disc and then vent the same through air outlet ports in the bottom planar panel 14. FIG. 6 shows that the center axis of each rotor 28 is broadened near the center portion 32 to deter midpoint deflection. Each of the rotor ends is attached to a fly weight 30 (FIGS. 3 and 5). FIG. 5 shows that end fly weights 30 are horizontally supported by bearings 34 contained in the lower portion of the aircraft's interior perimeter rim in circumferential channels above the bottom sheathed panel. Returning to FIG. 6, the counter-rotating gear, located near the bottom sheathed panel, is shown supporting an exterior flanged plate 36.

Figure 7:
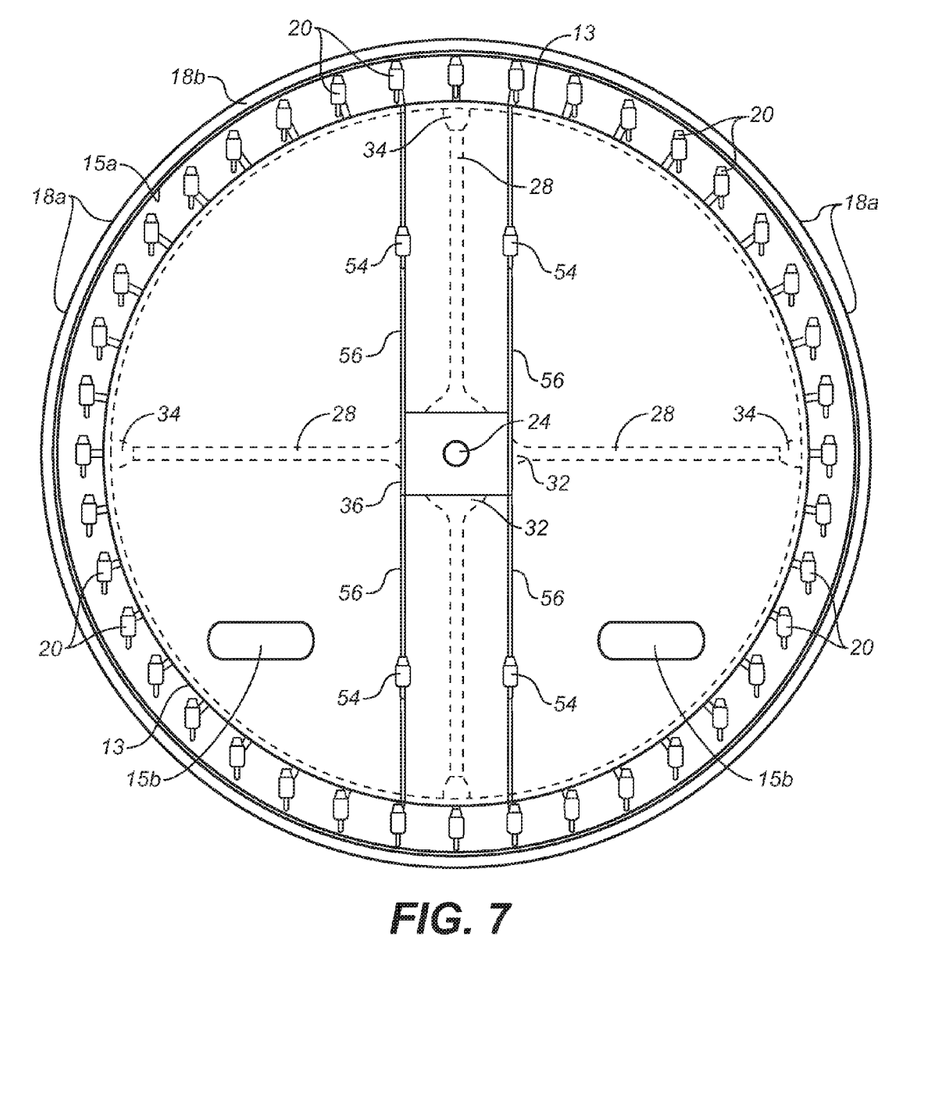
FIG. 7 is a bottom view of an embodiment of the aircraft illustrating the placement of the turbojets, the gyroscopic rotor blades, and the bottom power rails.

FIG. 7 is a bottom view of an embodiment of the aircraft illustrating the placement of the turbojets, the gyroscope rotor blades, and the bottom power rails. FIG. 7 shows optional turbojets 54, which may be affixed to parallel power rails 56 affixed to the outside exterior of flanged plate 36. Optional turbojets 54 may be added to, for example, enhance forward speed.

Returning to FIG. 3, the aircraft 10 may be supported on the ground by helicopter type skids 38 located equidistant outboard of the aircraft's bow to stern midline. In an embodiment, in addition to or instead of skids 38, four retractable struts may be stored in recessed compartments within the aircraft's sheathed bottom panel.

Pilot cabin 44 and canopy 42 may be of conventional design containing a control suite for pilot inputs to engage alternative mechanisms involving a CPU control box (Fly by Wire) which governs all flight functions through various actuators, solenoid/traducers, cables and levers. Auxiliary internal combustion engine 22 may be positioned below pilot cabin 44. Internal combustion engine 22 provides rotational power to gyroscopic rotor blades 28, compression for hydraulic systems, and power for an electric alternator.

Fuel for auxiliary engine 22 and turbojets 20 may be contained in multiple fuel bladders 46 affixed internally in a circumferential pattern to the interior of the aircraft's upper perimeter wall above the rotor channels. In an embodiment, the fuel bladders are of substantially the same volume, and fuel is drained from all circumferential fuel bladders simultaneously to maintain stability.

Adjustment of flight attitude is achieved by varying the direction of thrust of some or all turbojets 20 in conjunction with four top panel flaps 40, two of which are located laterally on the top panel evenly spaced from the midpoint of the aircraft and proximate the top panel perimeter, and two of which are located proximate to the perimeter at the aircraft stern and bow midpoints (see FIG. 2). Flaps 40 are recessed in the sheathed top panel and extend above the top panel. Flaps 40 may be actuated by conventional means through hydraulic, solenoid/traducer, and/or cable actuated mechanisms.

Figure 8:
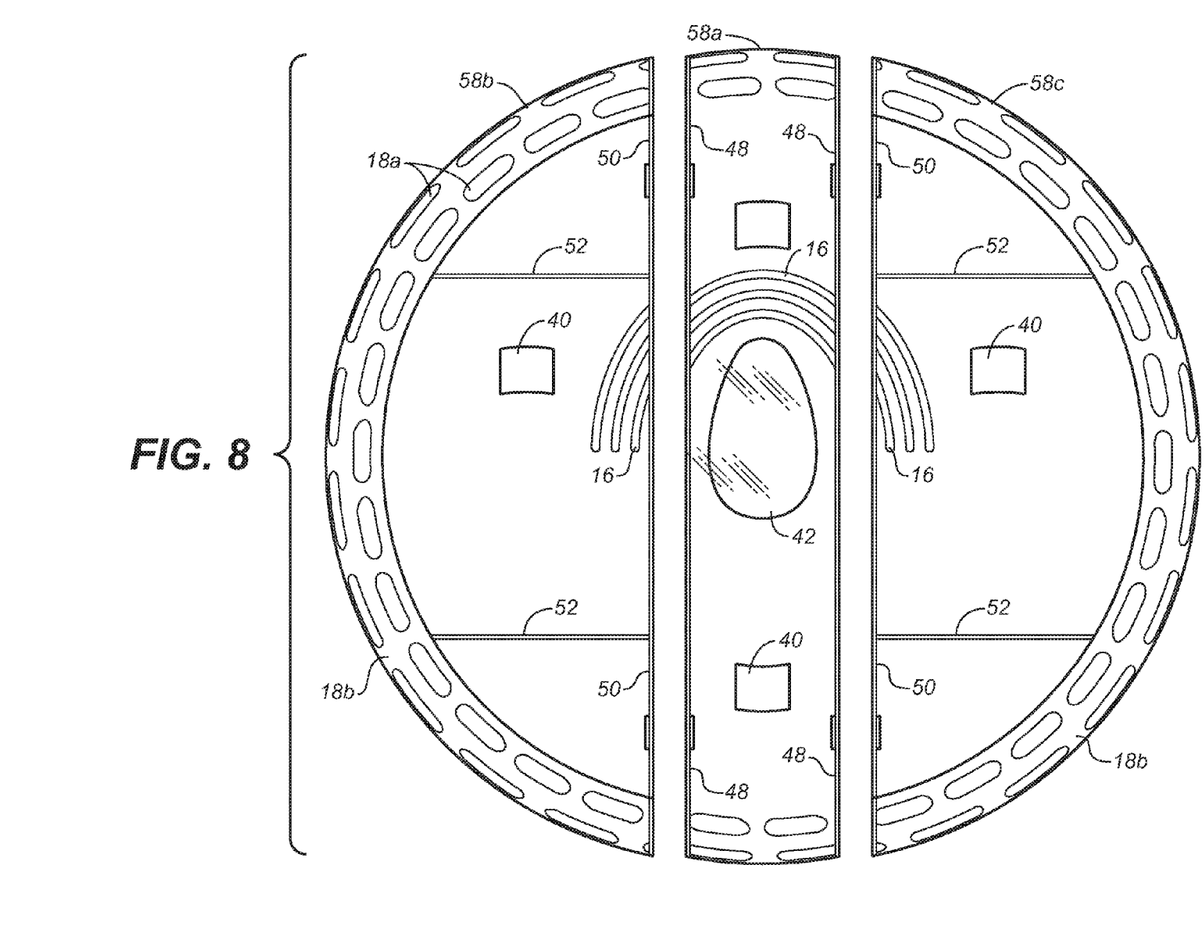
FIG. 8 is a transparent top plan view of an embodiment of the aircraft illustrating the form and location of the spars and fuselage rib side panels in a storage/travel configuration.

FIG. 8 is a top transparent exterior/interior view of an embodiment of aircraft 10 illustrating the form and location of the spars and fuselage rib side panels in a storage/travel configuration. In the storage/travel configuration, a rectangular box fuselage 58a bisects the craft from bow to stern with plywood (or comparable sheer panel material) ribs (or "sidings") 48 (see also FIG. 9) affixed to the frame to provide a support structure for the hinging apparatus connecting the wing sections to the fuselage. As shown in FIG. 8, the right and left airfoil sections 58b, 58c, respectively, are parts of semicircles, but in embodiments the shape of the wing sections, and the overall shape of aircraft 10, may be other shapes that provide for placing turbojets 20 about a perimeter of the shape and also housing gyroscopes 28. The tubular construction of each airfoil portion (or wing) is in turn attached to a single internal rib 50 facing the central section of the fuselage and connected to the hinging apparatus. Rib 50 supports two attached spars 52 (see also FIG.

Figure 9:
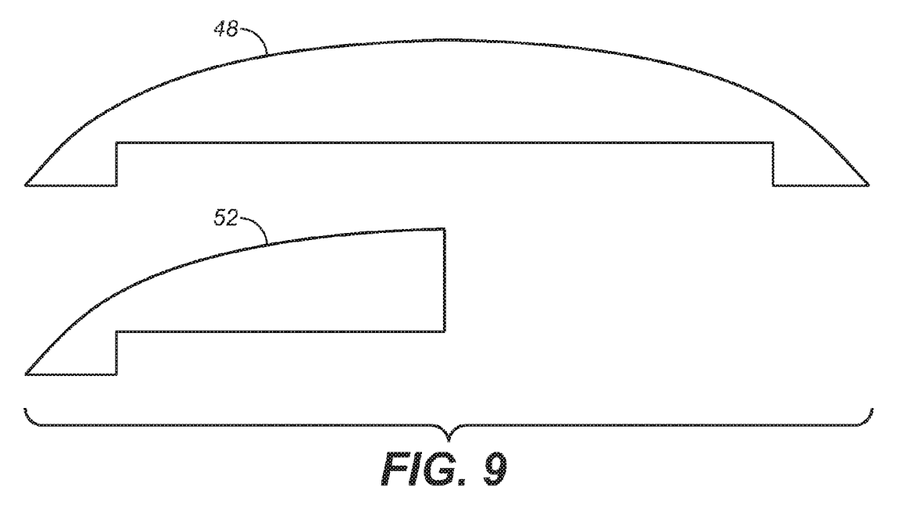
FIG. 9 is a side view of fuselage panel elements.
Figure 10:
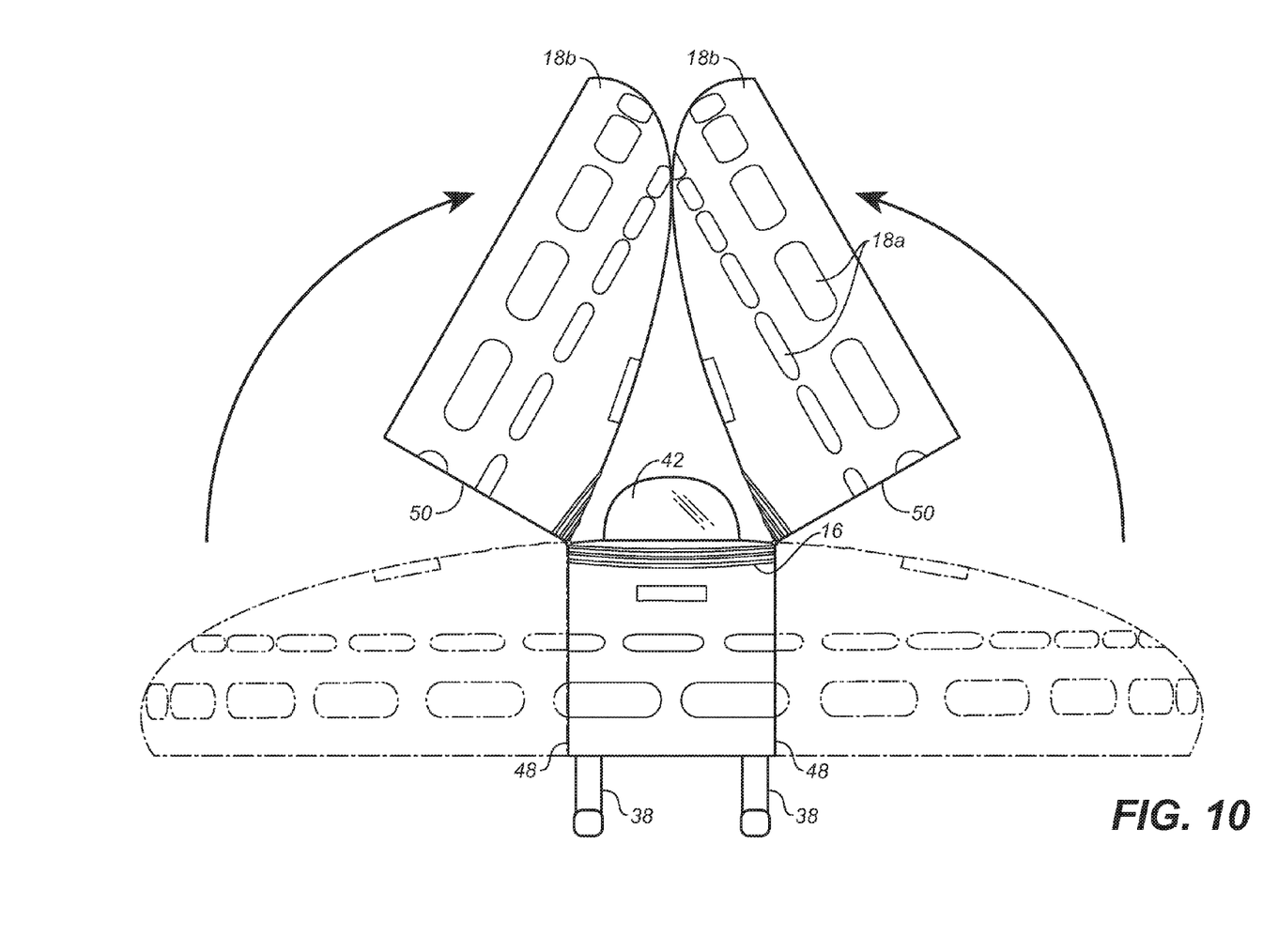
FIG. 10 is a front view of the aircraft in its folded storage/travel configuration.

9) that extend to the curved perimeter of the wing. This design is identical for both wing sections.

In an embodiment, the aircraft 10 is simple to operate. Starting from a parked (static) position, the turbojets 20 are engaged and a number of the peripheral turbojets are directed to provide vertical thrust, consistent with the CPU biases for initial take off, while a remaining number of turbojets are directed to provide horizontal thrust for forward flight. This ability to simultaneously balance between vertical and horizontal flight provides a substantial safety factor over the current design of the Osprey, for example, and its attendant problems when converting from vertical to horizontal flight. Forward speed and directional control may be achieved through throttle controls by actuating CPU selected turbojets 20 located at opposed sides of aircraft 10 with assistance available from port and starboard flaps 40.

Flight stability in a level position is achieved by using by gyroscopic stabilizers 28 with assistance available from the port, starboard, bow, and stern flaps 40. The angle of attack is achieved by CPU selected turbojets 20 with assistance provided as needed by the bow and stern flaps 40. Landing of the aircraft, at a CPU dictated speed, requires a reversal of the takeoff procedure described above, coupled with a flaring maneuver to inhibit forward motion. All of the foregoing directional movements are subject to pilot control and adjustment.

Figure 11:
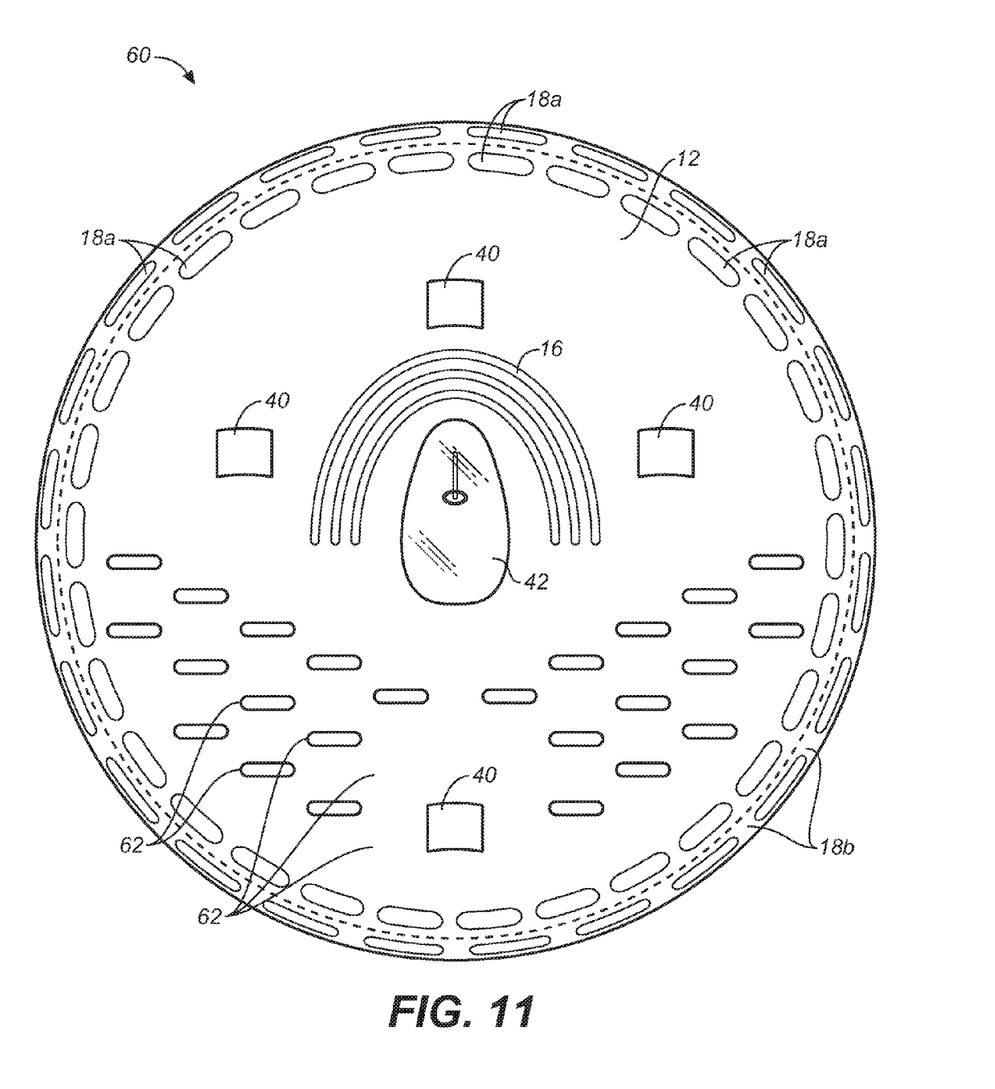
FIG. 11 is a top plan view showing an alternative embodiment that includes a plurality of slots disposed across the top rear panel of the aircraft.

FIG. 11 is a top plan view showing an alternative configuration 60 for the top panel 12 (other structural and operational features remaining the same as those of the above-described embodiment). Analysis of lift problems associated with disc-shaped aircraft reveal that at any angle of attack greater than 9 degrees or more, the center of lift is slightly forward of the geometric center of the disc, and the rear half of the deck of the disc provides no measurable lift during flight. This condition can be advantageously addressed by perforating the rear half of the top panel with multiple longitudinally oriented slots (vents) 62. For an aircraft having dimensions as described above, slots of approximately one inch in width and six inches in length are sufficient. These serve as outlet ports for air to pass through to create a downdraft effect induced by the gyroscopic rotor blades, which for this purpose may be canted or pitched to pull air through the ports and exhaust it through the bottom panel outlet ports 15b. This provides lift on the rear half of the disc deck.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A disc-shaped aircraft, comprising:
a convex upper surface and a planar lower surface forming a disc-shaped airfoil, said convex upper surface and planar lower surface converging at their respective lower edges to form a circumferential engine bay and power alley;
a plurality of mini turbojets positioned around said engine bay and having engine adjustment apparatus to effect selective and adjustable vertical and horizontal thrust from said mini turbojets;
at least two counter-rotating gyroscopic blades rotating about a vertical axis at or proximate the geometric center of said airfoil;
a pilot cabin; and
directional flaps disposed on said convex upper surface.

2. The aircraft of claim 1, wherein said mini turbojets are disposed below said planar lower surface on jet mounts attached to an engine mount wall disposed interior to said convex upper panel.

3. The aircraft of claim 2, wherein said upper convex surface includes a semicircular inner rim forming a shroud surrounding the outside perimeter of the disc and extending below said planar lower surface so as to form a power alley.

4. The aircraft of claim 3, wherein said power alley allows thrust from a plurality of said mini turbojets to be adjustably directed from generally horizontal directions to fully vertical direction.

5. The aircraft of claim 4, wherein the adjustability of said mini turbojets is accomplished by actuators that rotate said turbojets from a vertical to a horizontal position.

6. The aircraft of claim 1, further including a storage/travel configuration.

7. The aircraft of claim 6, wherein said storage/travel configuration includes a curved convex top rectangular fuselage bisecting the aircraft from bow to stern and semicircular wings pivotally coupled to said fuselage.

8. The aircraft of claim 7, wherein said fuselage includes sidings affixed to a tubular frame structure on which hinges are disposed for the pivotal connection of said wings to said fuselage.

9. The aircraft of claim 8, wherein each wing is attached to a unitary rib in a facing relationship to the length of said fuselage.

10. The aircraft of claim 1, wherein said counter-rotating gyroscopic blades are selectively decoupled and clamped along a midline of said fuselage for selective placement in a storage/travel configuration.

11. The aircraft of claim 1, wherein said gyroscopic counter-rotating blades are impelled on a centered shaft generally at the yaw axis of said aircraft and extending below said pilot cabin.

12. The aircraft of claim 1, wherein said turbojets are disposed within a power alley shroud from fixed jet engine mounts by gimbal structures, thereby permitting rotation of said turbojets in a horizontal and/or or vertical position by mechanical actuators.

13. The aircraft of claim 1, wherein said pilot cabin is located in the upper center of said disc-shaped airfoil.

14. An aircraft comprising:
a disc-shaped fuselage shaped to provide lift when moving in a plurality of directions;
a cockpit disposed generally in the center of said disc-shaped fuselage;
a plurality of mini turbojets housed within and positioned about the periphery of the fuselage;
a direction control system and structure to vary the direction and degree of thrust, or a portion of thrust, from said mini turbojets devices according to pilot inputs;
an auxiliary power source; and a gyroscope housed within said fuselage and powered by said auxiliary power source.

15. The aircraft of claim 14, wherein said gyroscope includes counter-rotating rotor blades extending to the periphery of the aircraft.

16. The aircraft of claim 14, further including fuel tanks disposed peripherally around an internal circumference of said the disc.

17. The aircraft of claim 14, further including fuel tanks disposed below said cockpit.

18. The aircraft of claim 14, wherein said directional control system and structure comprises mounting structure for said mini turbojets having gimbals providing rotational movement of said mini turbojets on vertical and horizontal axes.

19. The aircraft of claim 18, wherein said mini turbojets are moved about said vertical and horizontal axes with actuators.

20. The aircraft of claim 14 further including air inlet slots penetrating the upper rear half surface of the disc to accommodate the suction of surface air into the body of the aircraft by the canted counter-rotating rotor blades and exhausting same through the bottom rear downdraft ports.

* * * * *